United States Patent
Kim

(10) Patent No.: US 9,185,280 B2
(45) Date of Patent: Nov. 10, 2015

(54) CAMERA MODULE

(71) Applicant: LG INNOTEK CO., LTD., Seoul (KR)

(72) Inventor: Sun Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 4 days.

(21) Appl. No.: 14/092,394

(22) Filed: Nov. 27, 2013

(65) Prior Publication Data

US 2014/0160324 A1    Jun. 12, 2014

(30) Foreign Application Priority Data

Dec. 6, 2012 (KR) .......... 10-2012-0141126

(51) Int. Cl.
*H04N 5/68*  (2006.01)
*H04N 5/225* (2006.01)

(52) U.S. Cl.
CPC ........... *H04N 5/2257* (2013.01); *H04N 5/2252* (2013.01)

(58) Field of Classification Search
None
See application file for complete search history.

(56) References Cited

U.S. PATENT DOCUMENTS

| | | | |
|---|---|---|---|
| 7,594,818 B1* | 9/2009 | Asai | 439/71 |
| 2006/0181633 A1* | 8/2006 | Seo | 348/340 |
| 2007/0117423 A1* | 5/2007 | Kim et al. | 439/83 |
| 2008/0170141 A1* | 7/2008 | Tam et al. | 348/294 |
| 2009/0223711 A1* | 9/2009 | Ueno et al. | 174/377 |
| 2011/0096224 A1* | 4/2011 | Lee | 348/374 |
| 2014/0036116 A1* | 2/2014 | Peng et al. | 348/294 |
| 2014/0043496 A1* | 2/2014 | Azuma | 348/208.7 |
| 2014/0092296 A1* | 4/2014 | Han | 348/373 |

* cited by examiner

*Primary Examiner* — Lin Ye
*Assistant Examiner* — Euel Cowan
(74) *Attorney, Agent, or Firm* — Birch, Stewart, Kolasch & Birch, LLP

(57) ABSTRACT

A camera module according to exemplary embodiments of the present disclosure includes a PCB (Printed Circuit Board) mounted with an image sensor, a base arranged at an upper surface of the PCB, a lens holder arranged at an upper surface of the base to support plural sheets of lenses, a shield can configured to protect the lens holder by being coupled to the upper surface of the base to expose a lateral surface of the base, and a conductive layer formed at the exposed lateral surface of the base.

15 Claims, 2 Drawing Sheets

CAMERA MODULE

Pursuant to 35 U.S.C. §119 (a), this application claims the benefit of earlier filing date and right of priority to Korean Patent Application No. 10-2012-0141126, filed on Dec. 6, 2012, the contents of which are hereby incorporated by reference in their entirety.

BACKGROUND OF THE DISCLOSURE

1. Field

The teachings in accordance with the exemplary embodiments of this present disclosure generally relate to a camera module.

2. Background

Recently, demand on small-sized camera modules is high as image input devices for various multimedia fields such as tablet computers, camera phones, PDAs (Personal Digital Assistants), smart phones, toys, monitoring cameras and video tape recorders. Particularly, the smart phones require small-sized camera modules in response to increased demand by consumers preferring miniaturized designs.

The camera module is generally manufactured using an image sensor chip or a photoelectric conversion device of a CCD (Charge Coupled Device) type or a CMOS (Complementary Metal Oxide Semiconductor) type to converge light from an object to a photosensitive element through a lens and to form an image of the object on a display medium such as an LCD (Liquid Crystal Display) display device.

EMI (Electro Magnetic Interference) is disturbance that affects an electrical circuit due to either electromagnetic induction or electromagnetic radiation emitted from an external source in a colorless and odorless state like air. The disturbance may interrupt, obstruct, or otherwise degrade or limit the effective performances of various machines and circuits, cause industrial disasters, and directly or indirectly affect human bodies.

Particularly, a camera module is mounted on mobile terminals and notebooks that generate a large amount of electromagnetic wave which in turn causes an erroneous operation of the mobile terminals and notebooks, such that multi-angled researches and technical development are being waged to reduce the EMI.

Generally, a camera module is provided with a metal-materialed shield can to emit the electromagnetic wave generated from an image sensor to outside for protection of the camera module and shield from the electromagnetic wave, or to prevent the image sensor from being erroneously operated by the electromagnetic wave generated from outside.

SUMMARY

An object of the present disclosure is to provide a camera module configured to reduce a volume of a shield can and to simultaneously shield the electromagnetic wave.

In order to achieve at least the above object, in whole or in part, and in accordance with the purposes of the disclosure, as embodied and broadly described, and in one general aspect of the present disclosure, there is provided a camera module, the camera module comprising:

a PCB (Printed Circuit Board) mounted with an image sensor;

a base arranged at an upper surface of the PCB;

a lens holder arranged at an upper surface of the base to support plural sheets of lenses;

a shield can configured to protect the lens holder by being coupled to the upper surface of the base to expose a lateral surface of the base; and a conductive layer formed at the exposed lateral surface of the base.

Preferably, but not necessarily, the conductive layer may be formed at a surface of the base in a form of an electronic circuit pattern layer.

Preferably, but not necessarily, the conductive layer may be connected to the PCB and the shield can using a conductive adhesive.

Preferably, but not necessarily, the conductive adhesive may be provided with a conductive epoxy, and coated on all parts where the PCB, the shield can and a plating part are mutually brought into contact.

Preferably, but not necessarily, the shield can may be formed with a metal material.

Preferably, but not necessarily, the shield can may be formed with a bottom surface having a size corresponding to that of the base.

Preferably, but not necessarily, the PCB may be formed with a ground terminal at an area connected to the conductive layer.

Preferably, but not necessarily, each of the base and the lens holder may be provided in a shape of a cube, and a width may be smaller than that of the base.

Preferably, but not necessarily, the base may be provided with a cubic shape, and the lens holder may be provided with a cylinder shape.

Preferably, but not necessarily, the base is formed by double-injection molding process, comprising a body part of the base is injection-molded with insulating material, and the conductive layer is formed with a conductive synthetic resin.

Preferably, but not necessarily, the base may be injection-molded while being included with impurities thereinside that react to light and heat during the injection-molding process, and the conductive layer may be formed by a surface operation such as a laser exposure to the injection-molded base.

Preferably, but not necessarily, the base may be such that the conductive layer is formed by metalizing an entire surface of a lateral wall surface.

Preferably, but not necessarily, the shield can may be formed to cover the lens holder only.

Preferably, but not necessarily, the shield can may be centrally formed with a through hole through which light included with an image is transmitted to a lens mounted on the lens holder, and the shield can is provided in a box shape of thin metal material.

The present disclosure has an advantageous effect in that an erroneous operation of a camera module and other electronic devices can be prevented that is caused by input and output of electromagnetic wave while maintaining reliability of the camera module, even if a shield can is miniaturized to protect only a lens holder forming an optical system, because a conductive layer is formed at an outside exposed surface of a base supporting the lens holder.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, exemplary embodiment of the present disclosure will be described in detail with reference to the accompanying drawings.

Figure 1:
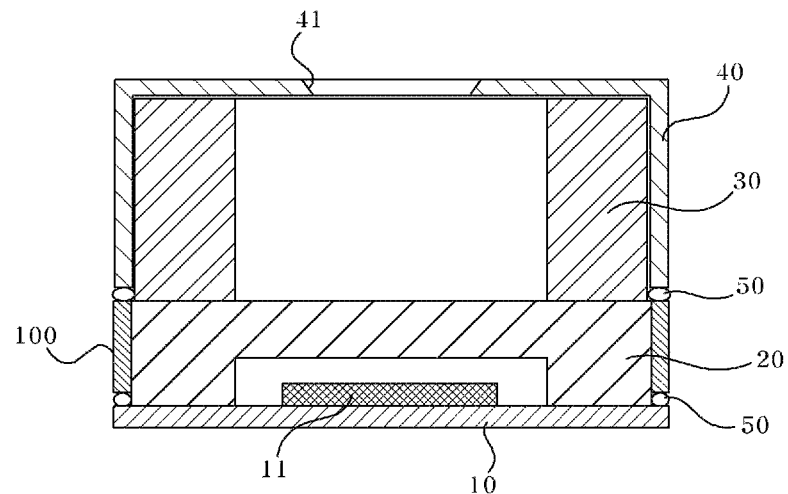
FIG. 1 is a schematic cross-sectional view illustrating a camera module according to an exemplary embodiment of the present invention.
Figure 2:
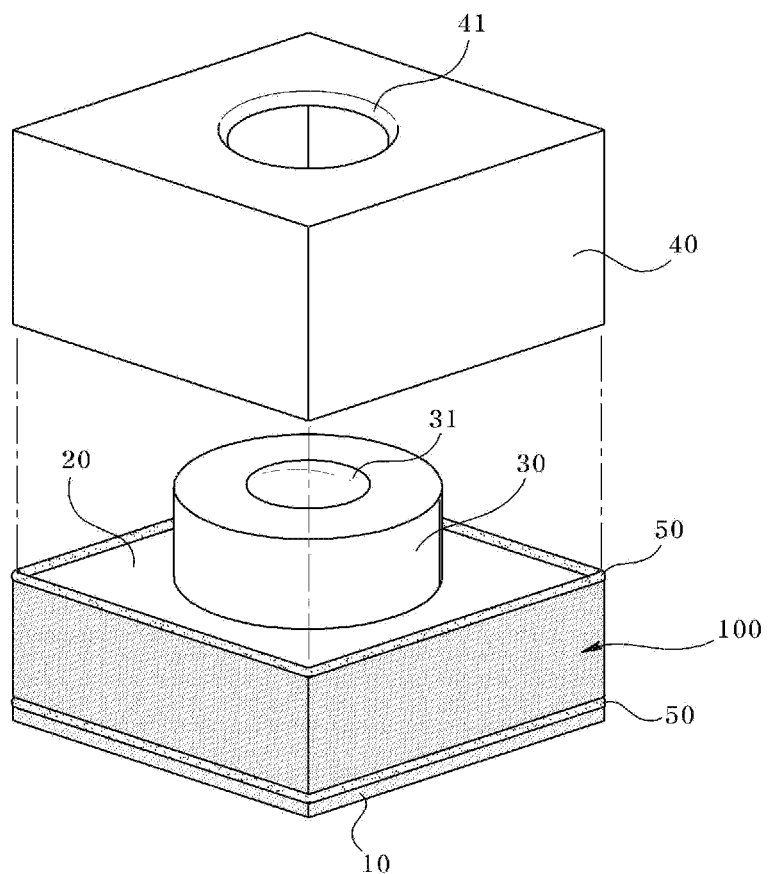
FIG. 2 is an exploded perspective view illustrating a camera module according to an exemplary embodiment of the present invention.
Figure 3:
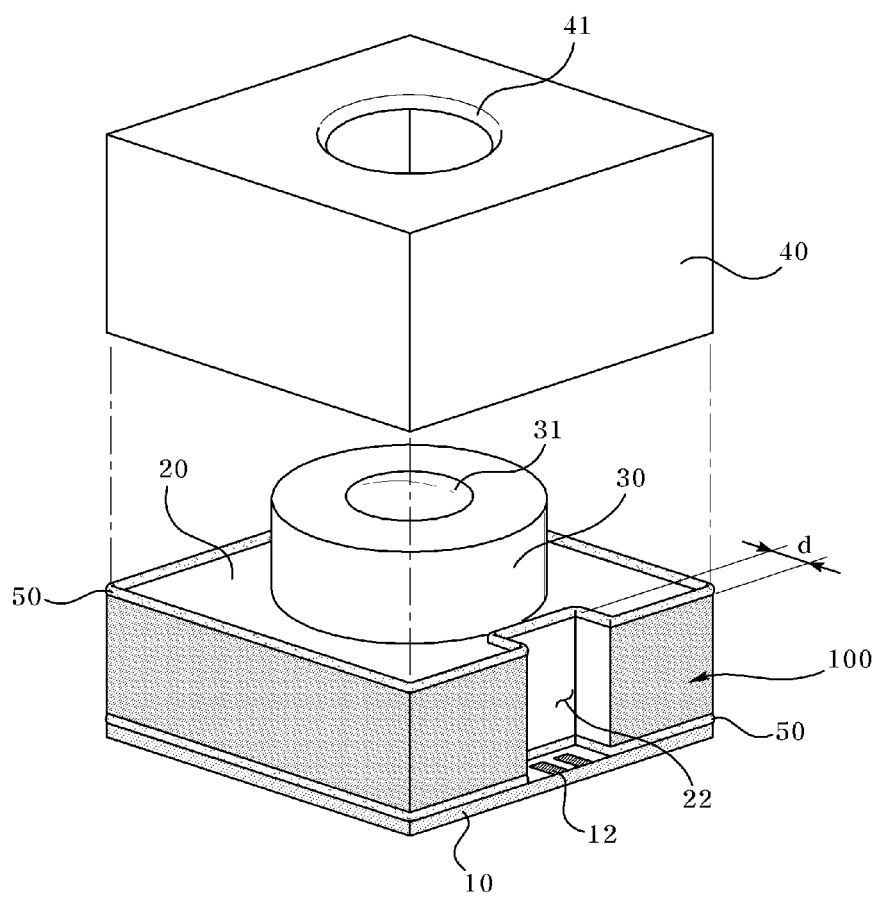
FIG. 3 is an exploded perspective view illustrating a camera module according to another exemplary embodiment of the present invention.

FIG. 1 is a schematic cross-sectional view illustrating a camera module according to an exemplary embodiment of the present invention, FIG. 2 is an exploded perspective view illustrating a camera module according to an exemplary embodiment of the present invention, and FIG. 3 is an exploded perspective view illustrating a camera module according to another exemplary embodiment of the present invention.

The camera module having an EMI shielding function according to an exemplary embodiment of the present disclosure can effectively shield the EMI (Electro Magnetic Interference) through a shield can coupled to the camera module and a metal-materialed conductive layer mounted at an outside of a base. At this time, the metal-materialed conductive layer can shield electromagnetic wave.

Referring to FIG. 1, the camera module according to an exemplary embodiment of the present invention may include a PCB 10, a base 20, a lens holder 30, a shield can 40 and a conductive layer 100. The lens holder 30 may be formed with an actuator, and the conductive layer 100 may be formed a metal-plated layer.

The PCB 10 may be mounted with an image sensor 11 to read an image, and may be mounted with a control driver for controlling constituent elements such as an actuator. Furthermore, the PCB 10 may be provided with at least one ground terminal at an area connected to the conductive layer 100.

The base 20 may perform a function of protecting the image sensor by being coupled to an upper surface of the PCB 10 and may be mounted with an IR (Infrared) cut-off filter to cut off an IR component from an image captured by the image sensor.

The lens holder 30 may be coupled to an upper surface of the base 20 and may take a shape corresponding to that of an inner surface of a shield can (described later) as illustrated in FIG. 1, and may take a shape of a cylinder as illustrated in FIG. 2. The shape of the lens holder 30 may take various shapes, if necessary. The lens holder 30 is mounted therein with at least one lens 31 to form an optical system, and an actuator (not shown) is mounted at an upper surface, at an inner surface or at an outside surface of the lens holder 30 to perform an auto focusing function and/or a hand-shake correction function.

Referring to FIGS. 1 and 2, the shield can 40 is centrally formed with a through hole to allow an outside image to be transmitted to a lens 31 side mounted at the lens holder 30. The shield can 40 takes a shape of a metal-materialed box to prevent exposure to outside by covering the lens holder 30. A distal end of the shield can 40 may be attached to and fixed at an upper surface of the base 20 using a conductive adhesive member 50 such as a conductive epoxy.

The camera module according to an exemplary embodiment of the present disclosure is characterized by miniaturization of the shield can 40. To this end, the shield can 40 is formed to cover only the lens holder 30. That is, coverage of the shield can 40 does not reach the base 20, but all areas or a partial area of the shield can 40 are attached to and fixed at an upper surface of the base 20 to cover only the lens holder 30. To this end, a size of a bottom surface of the shield can 40 may correspond to that of the upper surface of the base 20.

The conductive layer 100 is formed at an entire exposed lateral wall of the base 20, and the conductive layer 100 may be formed with a metal material using a technology forming an electronic circuit pattern layer on a surface. Also, the conductive layer 100 may be formed at an exposed portion of the base 20.

The technology of forming the conductive layer on the surface may be largely classified into three methods.

A first method may be a patterning method through an over-molding which is a process that is used in manufacturing forms to create parts and improve product efficiency. That is, the over-molding or two-shot molding is an injection molding process using two separate molds of which one material is molded over another material. In this case, a part forming the base 20 is used with one material and a part forming the conductive layer is used with another material, where two parts are injection-molded.

In this case, a body part of the base 20 may be molded with an insulating material while a lateral wall part forming the conductive layer 100 may be molded using a conductive synthetic resin. Alternatively, a part to be formed with the conductive layer may be molded using a synthetic resin capable of being easily metal-plated, and the base 20 may be injection-molded to finish the conductive layer using a post-processing such as a plating process.

A second method is such that, the base 20 is injection-molded while containing impurities reacting to light and heat, and an laser exposure is performed on an exposed lateral wall surface to be formed with the conductive layer 100 using a surface patterning work such as the laser exposure, on which the conductive layer 100 is formed.

A third method may be an entire surface metalizing method. In this case, an entire surface of the lateral wall surface of the base 20 is metalized to form the conductive layer 100 on the exposed surface of the lateral wall. When the conductive layer 100 is formed on the exposed lateral wall surface of the base 20, the conductive layer 100 on the exposed lateral wall surface of the base 20 can perform the electromagnetic wave cut-off function, even if the shield can 40 is relatively made smaller than the conventional camera module to allow covering only the lens holder 30.

Meanwhile, attachment of the conductive layer 100 on the base 20 using a double-sided tape of a known EMI cut-off member such as an electromagnetic wave cut-off tape may be considered in lieu of the abovementioned technologies. However, this method may decrease the assemblability, and if the method is used on an entire exposed lateral wall surface of the base 20, a problem such as coming-off or separation of the tape may occur later, such that it would be preferable that a metal material using the abovementioned technology be coated on the surface of the base 20.

Thus, the lens holder 30 forming an optical system can be protected by the metal-materialed shield can 40 according to the abovementioned configuration to maximally protect the optical system against an external shock. In addition, influence by the electromagnetic wave generated in the course of operation of the camera module can be maximally reduced, because a circumferential surface of the base 20 is shielded against the electromagnetic wave by the conductive layer 100.

Referring to FIG. 1, the conductive layer 100 may be conductively attached to and fixed at an area where the shield can 400 and the PCB 10 are brought into contact, using a conductive epoxy or a conductive material 50. The electromagnetic wave of the shield can 40 and the conductive layer 100 may be grounded through the PCB 10 conductive material 50 using the conductive material 50.

Meanwhile, the conductive layer 100 needs to be prevented from being short-circuited from a wiring member (not shown) that supplies electricity to the actuator (not shown). FIG. 3 illustrates an example of preventing short-circuit of the conductive layer 100 and a terminal part by partially deforming a shape of the base.

Referring to FIG. 3, a terminal part 12 may be formed at a partial upper surface of the PCB 10 for electrical connection with an actuator (not shown). Furthermore, an area corresponding to that of the base 20 opposite to the terminal part 12 may be formed with a concave part 22. The concave part 22 may be concavely formed with a predetermined depth (d) to prevent the terminal part 12 from being electrically connected to the conductive layer 100. The terminal part 12 may be connected to a wiring member (not shown) using a soldering or a conductive epoxy, where various connecting members may be variably used depending on design and assembly conditions.

The conductive layer 100 may not be formed near to an area connected by the terminal part 12 in order to prevent short-circuit between the terminal part 12 and the shield can 40, and as illustrated in FIG. 3, an inner surface of the concave part 22 is not formed with a conductive layer 100 while other areas than the inner surface of the concave part 12 may be formed with the conductive layer. Alternatively, the concave part 22 may be also formed with a conductive layer 100 where a predetermined distance from the terminal part 12 may be maintained.

Hence, the abovementioned configuration can prevent erroneous operations of camera module and electronic devices caused by inflow of electromagnetic wave while maintaining reliability of the camera module, even if a shield can is made relatively smaller than a conventional camera module to allow covering only a lens holder forming an optical system, because electromagnetic wave shielding function can be performed by forming a conductive layer on an exposed outside surface of a base supporting the lens holder.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

What is claimed is:

1. A camera module, the camera module comprising:
   a PCB (Printed Circuit Board) mounted with an image sensor;
   a base arranged at an upper surface of the PCB;
   a lens holder arranged at an upper surface of the base and supporting at least one lens; a shield can configured to protect the lens holder by being coupled to the upper surface of the base to expose a lateral surface of the base; and
   a continuous conductive layer formed only on an entire exposed lateral surface of the base wherein said layer is in contact with said lateral surface.

2. The camera module of claim 1, wherein the conductive layer is formed at the entire exposed lateral surface of the base in a form of an electronic circuit pattern layer.

3. The camera module of claim 1, wherein the conductive layer is respectively connected to the PCB and the shield can using a conductive adhesive.

4. The camera module of claim 3, wherein the conductive adhesive is provided with a conductive epoxy, and coated on all parts where the PCB, the shield can and a plating part are mutually brought into contact.

5. The camera module of claim 1, wherein the shield can is formed with a metal material.

6. The camera module of claim 1, wherein the shield can is formed with a bottom surface having a size corresponding to that of the base.

7. The camera module of claim 1, wherein the PCB is formed with a ground terminal at an area connected to the conductive layer.

8. The camera module of claim 1, wherein each of the base and the lens holder is provided in a shape of a cube, and a width of the lens holder is smaller than that of the base.

9. The camera module of claim 1, wherein the base is provided with a cubic shape, and the lens holder is provided with a cylinder shape.

10. The camera module of claim 1, wherein the base is fonned by double-injection molding process, comprising a body part of the base is injection-molded with insulating material, and the conductive layer is formed with a conductive synthetic resin.

11. The camera module of claim 1, wherein the base is injection-molded while being included with impurities thereinside that react to light and heat during the injection-molding process, and the conductive layer is formed by a surface operation such as a laser exposure to the injection-molded base.

12. The camera module of claim 1, wherein the base is such that the conductive layer is formed by metalizing an entire surface of a lateral wall surface.

13. The camera module of claim 1, wherein the shield can is formed to cover the lens holder only.

14. The camera module of claim 1, wherein the shield can is centrally formed with a through hole through which light included with an image is transmitted to a lens mounted on the lens holder, and the shield can is provided in a box shape of thin metal material.

15. The camera module of claim 3, wherein an electromagnetic wave of the shield can and the conductive layer is grounded through the PCB.

* * * * *